US012414212B2

(12) United States Patent
Yang et al.

(10) Patent No.: US 12,414,212 B2
(45) Date of Patent: Sep. 9, 2025

(54) BOOST CIRCUIT FOR DRIVING LIGHT-EMITTING DIODE AND ELECTRICAL DEVICE COMPRISING THE SAME

(71) Applicant: Gulf Security Technology Co., Ltd., Qinhuangdao (CN)

(72) Inventors: Maoqing Yang, Qinhuangdao (CN); Lianxu Liu, Qinhuangdao (CN); Jianfeng Shi, Qinhuangdao (CN)

(73) Assignee: GULF SECURITY TECHNOLOGY CO., LTD., Hebei (CN)

( * ) Notice: Subject to any disclaimer, the term of this patent is extended or adjusted under 35 U.S.C. 154(b) by 127 days.

(21) Appl. No.: 18/318,931

(22) Filed: May 17, 2023

(65) Prior Publication Data

US 2023/0380035 A1 Nov. 23, 2023

(51) Int. Cl.
*H05B 45/38* (2020.01)
*H05B 45/325* (2020.01)

(52) U.S. Cl.
CPC ........... *H05B 45/38* (2020.01); *H05B 45/325* (2020.01)

(58) Field of Classification Search
CPC .... H05B 45/38; H05B 45/325; H05B 45/375; H05B 45/385; H05B 45/3725
See application file for complete search history.

(56) References Cited

U.S. PATENT DOCUMENTS

| | | | | | |
|---|---|---|---|---|---|
| 8,860,319 | B2 * | 10/2014 | Naruo | H05B 45/14 | 315/307 |
| 9,775,202 | B2 * | 9/2017 | Seki | H02M 3/33523 | |
| 2001/0043113 | A1 * | 11/2001 | Hoshino | H04B 10/564 | 327/534 |
| 2005/0052170 | A1 * | 3/2005 | Kim | H02M 3/07 | 323/282 |
| 2010/0118572 | A1 * | 5/2010 | Mednik | H05B 45/375 | 363/90 |
| 2010/0315021 | A1 * | 12/2010 | Lau | H05B 45/38 | 315/294 |
| 2012/0056560 | A1 * | 3/2012 | Iwai | H05B 45/38 | 315/297 |
| 2016/0057825 | A1 * | 2/2016 | Hu | H05B 45/325 | 315/201 |
| 2019/0029086 | A1 * | 1/2019 | Wang | H05B 45/3725 | |
| 2022/0085610 | A1 * | 3/2022 | DeJonge | H02J 1/14 | |

* cited by examiner

*Primary Examiner* — Tung X Le
(74) *Attorney, Agent, or Firm* — CANTOR COLBURN LLP

(57) ABSTRACT

The present application relates to a boost circuit for driving a light-emitting diode. The boost circuit comprises: a first input terminal operably connected with an external power supply; a second input terminal operably connected with a pulse width modulation signal source; an output terminal operably connected with the light-emitting diode; a first capacitor, a positive electrode of which is coupled with the first input terminal and the output terminal, and a negative electrode of which is coupled with the second input terminal; and a second capacitor, a positive electrode of which is coupled with the positive electrode of the first capacitor and the output terminal, and a negative electrode of which is grounded, wherein, when an applied pulse width modulation signal is at low level, the external power supply charges the first capacitor with a first voltage.

6 Claims, 3 Drawing Sheets

BOOST CIRCUIT FOR DRIVING LIGHT-EMITTING DIODE AND ELECTRICAL DEVICE COMPRISING THE SAME

CROSS REFERENCE TO A RELATED APPLICATION

The application claims the benefit of China Patent Application No. 202210539906.5 filed May 18, 2022, the contents of which are hereby incorporated in their entirety.

TECHNICAL FIELD

The present application relates to power supply technology, and in particular to a boost circuit for driving a light-emitting diode and an electrical device comprising the boost circuit.

BACKGROUND

In order to reduce false alarms from smoke detectors, dual-band detection technology is increasingly being used. In a dual-band detector, an infrared light-emitting diode and blue light-emitting diode are typically used as light-emitting elements. Compared to the infrared light-emitting diode, the blue light-emitting diode requires a higher driving voltage (at least 3V or higher). Currently, most of the batteries used to power smoke detectors use a rated voltage of 3V, and as the usage process continues, the battery voltage will gradually decrease.

Since the battery cannot directly drive the blue light-emitting diode, the battery voltage needs to be raised. The commonly used solution is to use a boost specific chip. However, this solution has drawbacks such as complex circuit structure and high implementation cost.

SUMMARY

According to an aspect of the present application, there is provided a boost circuit for driving a light-emitting diode, comprising: a first input terminal operably connected with an external power supply; a second input terminal operably connected with a pulse width modulation signal source; an output terminal operably connected with the light-emitting diode; a first capacitor, a positive electrode of which is coupled with the first input terminal and the output terminal, and a negative electrode of which is coupled with the second input terminal; and a second capacitor, a positive electrode of which is coupled with the positive electrode of the first capacitor and the output terminal, and a negative electrode of which is grounded, wherein, when an applied pulse width modulation signal is at low level, the external power supply charges the first capacitor with a first voltage, and when the applied pulse width modulation signal is at high level, the first capacitor charges the second capacitor with a second voltage higher than the first voltage, such that a third voltage output via the output terminal to the light-emitting diode is greater than the first voltage.

Optionally, the above boost circuit further comprises a first diode connected between the first input terminal and the positive electrode of the first capacitor to prevent reverse charging of the external power supply by the first capacitor.

Optionally, the above boost circuit further comprises a second diode connected between the positive electrode of the first capacitor and the second capacitor to prevent reverse charging of the first capacitor by the second capacitor.

In the above boost circuit, in addition to one or more of the above-mentioned features, the second capacitor is an electrolytic capacitor.

In the above boost circuit, in addition to one or more of the above-mentioned features, the first capacitor charges the second capacitor with the second voltage having twice the amplitude of the first voltage by setting amplitude of the high level of the pulse width modulation signal to the first voltage.

In the above boost circuit, in addition to one or more of the above-mentioned features, the external power supply is a battery, the light-emitting diode is a blue light-emitting diode, and the pulse width modulation signal source is a microcontroller.

According to another aspect of the present application, there is provided an electrical device, comprising: a light-emitting diode; a microcontroller; a battery; a boost circuit comprising: a first input terminal operably connected with the battery; a second input terminal operably connected with the microcontroller; an output terminal operably connected with the light-emitting diode; a first capacitor, a positive electrode of which is coupled with the first input terminal and the output terminal, and a negative electrode of which is coupled with the second input terminal; and a second capacitor, a positive electrode of which is coupled with the positive electrode of the first capacitor and the output terminal, and a negative electrode of which is grounded, wherein, when a pulse width modulation signal applied by the microcontroller at the second input terminal is at low level, the battery charges the first capacitor with a first voltage, and when the pulse width modulation signal applied by the microcontroller at the second input terminal is at high level, the first capacitor charges the second capacitor with a second voltage higher than the first voltage, such that a third voltage output via the output terminal to the light-emitting diode is greater than the first voltage.

Optionally, the electrical device further comprises a switching element coupled with the light-emitting diode, the microcontroller is coupled with a control terminal of the switching element to control light-emitting state of the light-emitting diode.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as “comprising” and “including” mean that in addition to units and steps that are directly and clearly stated in the specification and claims, the technical solution of the application does not exclude the presence of other units and steps that are not directly and clearly stated in the specification and claims.

Unless otherwise specified, terms such as “first” and “second” do not indicate the order of the units in terms of time, space, size, etc., but are merely used to distinguish the units.

In this specification, “coupling” should be understood as including the direct transmission of electrical energy or signals between two units, or the indirect transmission of the electrical energy or signals through one or more third units.

In this specification, “electrical device” refers to a device capable of achieving various electrical functions, including, for example, but not limited to, a smoke detector, a fire alarm controller, and an intrusion detector.

According to some embodiments of the present application, a boost circuit is provided between an external power supply (e.g., a battery) and a light-emitting diode, and the boost circuit includes a first capacitor connected with the external power supply and a second capacitor connected with the light-emitting diode. The first capacitor is charged by the external power supply with a first voltage during a first time period, and during a subsequent second time period, the second capacitor may be charged with a second voltage higher than the first voltage by raising the reference voltage of the negative electrode of the first capacitor during the second time period. By alternating the first time period and the second time period multiple times, the driving voltage of the second capacitor to the light-emitting diode is raised to the desired level or the rated operating voltage of the light-emitting diode.

Specific embodiments of the present application are further described below with the aid of the accompanying drawings. It is noted that some non-essential features or circuit elements are not shown in the accompanying drawings in order to more clearly describe what is relevant to the present application. However, for those skilled in the art, this omission does not create difficulties in the implementation of the technical solutions described in the specification of the application.

Figure 1:
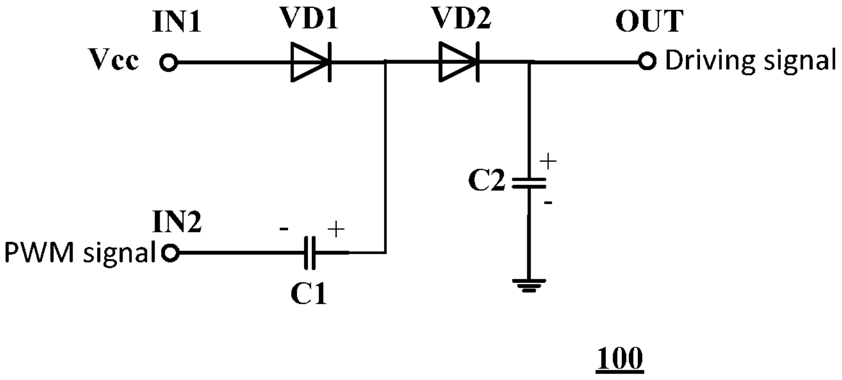
FIG. 1 is a circuit schematic diagram of a boost circuit for driving a light-emitting diode in accordance with some embodiments of the present application.

FIG. 1 is a circuit schematic diagram of a boost circuit for driving a light-emitting diode in accordance with some embodiments of the present application.

A boost circuit 100 shown in FIG. 1 includes a first input terminal IN1, a second input terminal IN2, an output terminal OUT, a first capacitor C1, a second capacitor C2, a first diode VD1 and a second diode VD2. The second capacitor C2 may be, for example, an electrolytic capacitor in order to store sufficient electrical energy. The first capacitor C1 may be, for example, a ceramic capacitor.

Referring to FIG. 1, in the boost circuit 100 shown in FIG. 1, the first input terminal IN1 is connected with an external power supply (e.g., a battery), the second input terminal IN2 is connected with a pulse width modulation signal source, and the output terminal OUT is connected with a light-emitting diode (e.g., a blue light-emitting diode) to provide a driving voltage to the light-emitting diode. Optionally, in this embodiment, the pulse width modulation signal source is implemented using a microcontroller.

Continuing with FIG. 1, the first diode VD1 and the second diode VD2 are connected in series between the first input terminal IN1 and the output terminal OUT, wherein a positive electrode of the first diode VD1 is connected with the first input terminal IN1 and a negative electrode is connected with a positive electrode of the second diode VD2, while a negative electrode of the second diode VD2 is connected with the output terminal OUT.

In the boost circuit 100 shown in FIG. 1, a positive electrode of the first capacitor C1 is connected with a negative electrode of the first diode VD1, and a negative electrode is connected with the second input terminal IN2. In addition, a positive electrode of the second capacitor C2 is connected with the negative electrode of the second diode VD2, and a negative electrode is grounded.

The operating principle of the boost circuit 100 shown in FIG. 1 is described below.

When the boost circuit 100 is in operation, a pulse width modulation signal is applied on the second input terminal IN2. Exemplarily, the pulse width modulation signal may have a square waveform in which high and low levels are alternately presented. However, it should be noted that the pulse width modulation signal is not limited to the square waveform, but may also have other waveforms, such as sawtooth wave.

Assuming that output voltage of the external power supply is Vcc, the voltage difference across the first capacitor C1 is Vcc when the applied pulse width modulation signal is at low level (e.g., the voltage is 0). That is, the external power supply charges the first capacitor C1 with voltage Vcc at this time. In addition, since the second capacitor C2 is connected with the first input terminal IN1 via the first diode VD1 and the second diode VD2, the voltage difference across the second capacitor C2 is also Vcc.

On the other hand, when the applied pulse width modulation signal is at high level (e.g., the voltage is Vh), the voltage difference across the first capacitor C1 is substantially maintained at Vcc due to the gradual change of the capacitor voltage, but the voltage of the positive electrode of the first capacitor C1 is (Vcc+Vh) because its voltage of the negative electrode is raised to Vh. At this time, the voltage of the positive electrode of the first capacitor C1 is higher than the voltage of the positive electrode of the second capacitor C2, so the first capacitor C1 will charge the second capacitor C2.

By alternately applying low and high level signals at the second input terminal IN2 multiple times, the charging process of the external power supply to the first capacitor and the charging process of the first capacitor to the second capacitor as described above may be repeated, thereby raising the driving voltage (the voltage of the positive electrode) output by the second capacitor to a level greater than Vcc. When there are enough alternating cycles, the driving voltage output by the second capacitor will converge to (Vcc+Vh). In one example, if the light-emitting diode has a rated operating voltage of V, the amplitude of the pulse width modulation signal may be set to (V-Vcc) to ensure that the light-emitting diode is driven by a sufficiently high voltage when the output voltage of the external power supply is Vcc.

Figure 2:
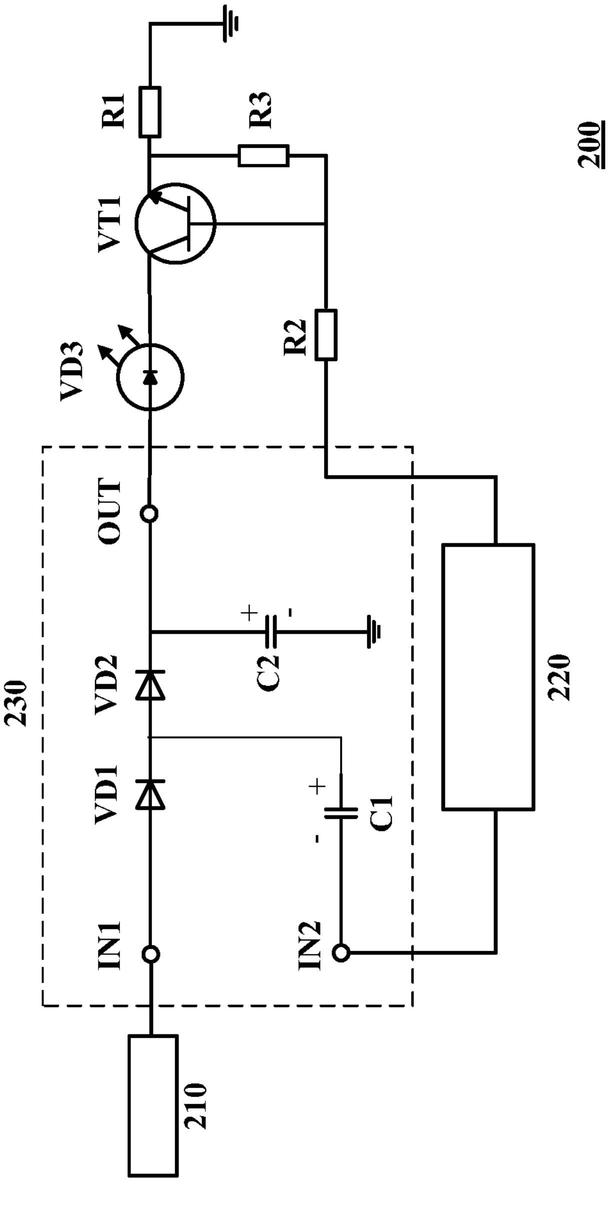
FIG. 2 is a circuit schematic diagram of an electrical device in accordance with some other embodiments of the present application.

FIG. 2 is a circuit schematic diagram of an electrical device in accordance with some other embodiments of the present application.

An electrical device 200 shown in FIG. 2 comprises a light-emitting diode VD3, a battery 210, a microcontroller 220, and a boost circuit 230.

In the electrical device shown in FIG. 2, the boost circuit 230 includes a first input terminal IN1, a second input terminal IN2, an output terminal OUT, a first capacitor C1, a second capacitor C2, a first diode VD1 and a second diode VD2.

Referring to FIG. 2, the first input terminal IN1 is connected with the battery 210, the second input terminal IN2 is connected with the microcontroller 220, and the output terminal OUT is connected with the light-emitting diode VD3 (e.g., a blue light-emitting diode).

Continuing with FIG. 2, the first diode VD1 and the second diode VD2 are connected in series between the first input terminal IN1 and the output terminal OUT, wherein a positive electrode of the first diode VD1 is connected with the first input terminal IN1 and a negative electrode is connected with a positive electrode of the second diode VD2, while a negative electrode of the second diode VD2 is connected with the output terminal OUT. A positive electrode of the first capacitor C1 is connected with a negative electrode of the first diode VD1, and a negative electrode is connected with the second input terminal IN2. In addition, a positive electrode of the second capacitor C2 is connected with the negative electrode of the second diode VD2, and a negative electrode is grounded.

The electrical device shown in FIG. 2 also comprises an NPN-type triode VT1 as a switching element. As shown in FIG. 2, a collector of the NPN-type triode VT1 is connected with the output terminal OUT of the boost circuit 230, the emitter is grounded via a resistor R1, and the base is coupled with the microprocessor 220 via a resistor R2 and connected to the emitter via a resistor R3.

The operating principle of the electrical device 200 shown in FIG. 2 is described below.

When it is necessary to drive the light-emitting diode VD3 into a light-emitting state (e.g. when smoke or intruding objects are detected), the microcontroller 220 first applies a pulse width modulation signal (e.g. a square waveform in which high and low levels are alternately presented) on the second input terminal IN2. Assuming that the output voltage of the battery 210 is Vcc, the battery 210 charges the first capacitor C1 with the voltage Vcc when the pulse width modulation signal is at low level. In addition, since the second capacitor C2 is connected with the first input terminal IN1 via the first diode VD1 and the second diode VD2, the voltage difference across the second capacitor C2 is also Vcc.

On the other hand, when the applied pulse width modulation signal is at high level (e.g., the voltage is Vh), the voltage of the positive electrode of the first capacitor C1 is (Vcc+Vh) because the voltage difference across the first capacitor C1 is substantially maintained at Vcc and its voltage of the negative electrode is raised to Vh. At this time, the first capacitor C1 charges the second capacitor C2.

After the pulse width modulation signal applied on the second input terminal IN2 lasts for a period of time, the driving voltage (the voltage of the positive electrode) output by the second capacitor will be raised to a level greater than Vcc, and when it lasts long enough, the driving voltage output by the second capacitor will converge to (Vcc+Vh).

After the applied pulse width modulation signal lasts for a period of time, the microcontroller 220 applies a higher voltage at the base of the NPN-type triode via the resistor R2, so that there is a larger current flowing through the collector of the NPN-type triode VT1 and the transistor VT1 is in saturation or conduction state. At this time, driven by the output voltage at the output terminal OUT, there is current flowing through the light-emitting diode VD3.

It should be noted that, although the switching element shown in FIG. 2 is implemented with the NPN-type triode, it may also be implemented with the PNP-type triode.

Figure 3:
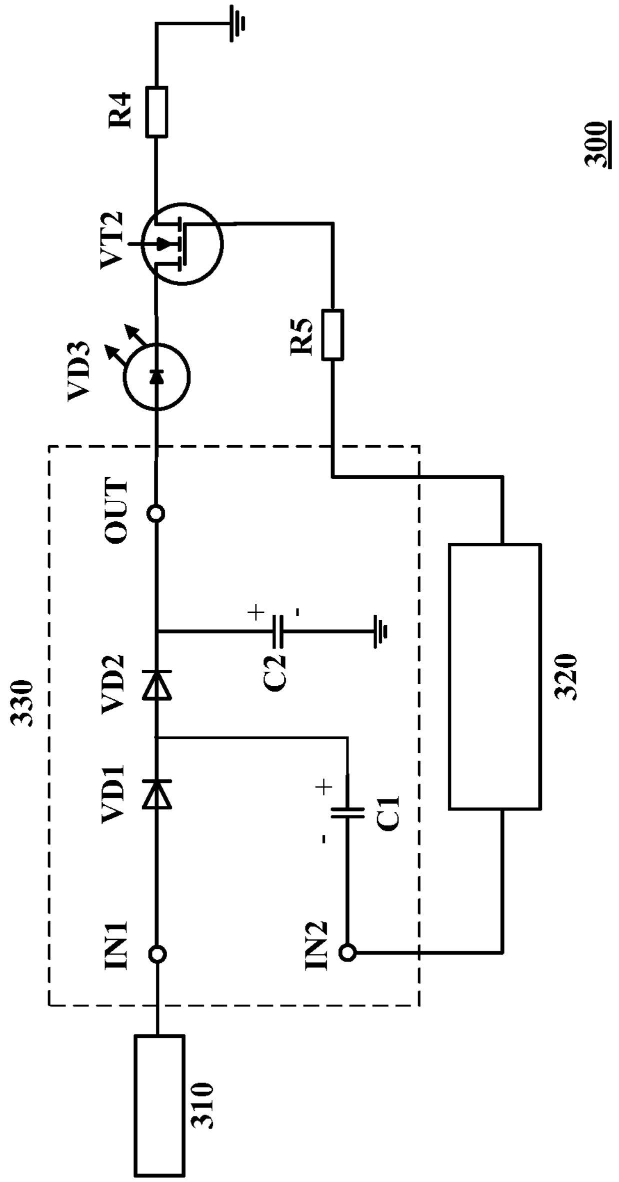
FIG. 3 is a circuit schematic diagram of an electrical device in accordance with some other embodiments of the present application.

FIG. 3 is a circuit schematic diagram of an electrical device in accordance with some other embodiments of the present application.

An electrical device 300 shown in FIG. 3 comprises a light-emitting diode VD3, a battery 310, a microcontroller 320, and a boost circuit 330.

To avoid redundancy, the following will mainly describe the differences between this embodiment and the embodiment shown in FIG. 2.

Referring to FIG. 3, the electrical device also comprises an N-type MOS tube VT2 as a switching element. As shown in FIG. 3, the source of the N-type MOS tube VT2 is connected with an output terminal OUT of the boost circuit 330, the drain is grounded via a resistor R4, and the gate is coupled with the microprocessor 320 via a resistor R5.

The operating principle of the electrical device 300 shown in FIG. 3 is described below.

Similarly, when it is necessary to drive the light-emitting diode VD3 into a light-emitting state (e.g. when smoke or intruding objects are detected), the microcontroller 320 first applies a pulse width modulation signal on the second input terminal IN2. The battery 310 charges the first capacitor C1 with the voltage Vcc when the pulse width modulation signal is at low level. On the other hand, when the applied pulse width modulation signal is at high level (e.g., the voltage is Vh), the first capacitor C1 charges the second capacitor C2.

After the pulse width modulation signal applied on the second input terminal IN2 lasts for a period of time, the driving voltage (the voltage of the positive electrode) output by the second capacitor will be raised to a level greater than Vcc, and when it lasts long enough, the driving voltage output by the second capacitor will converge to (Vcc+Vh).

After the applied pulse width modulation signal lasts for a period of time, the microcontroller 320 applies a higher voltage at the gate of the N-type MOS tube VT2 via the resistor R5, causing the N-type MOS tube VT2 to conduct. At this time, driven by the output voltage at the output terminal OUT, there is current flowing through the light-emitting diode VD3.

It should be noted that although the switching element shown in FIG. 3 is implemented with the N-type MOS tube, it may also be implemented with a P-type MOS.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and implementations shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. An electrical device, comprising:

a light-emitting diode;

a microcontroller;

a battery;

a boost circuit comprising:

a first input terminal operably connected with the battery;

a second input terminal operably connected with the microcontroller;

an output terminal operably connected with the light-emitting diode;

a first capacitor, a positive electrode of which is coupled with the first input terminal and the output terminal, and a negative electrode of which is coupled with the second input terminal; and a second capacitor, a positive electrode of which is coupled with the positive electrode of the first capacitor and the output terminal, and a negative electrode of which is grounded, wherein, when a pulse width modulation signal applied by the microcontroller at the second input terminal is at low level, the battery charges the first capacitor with a first voltage, and when the pulse width modulation signal applied by the microcontroller at the second input terminal is at high level, the first capacitor charges the second capacitor with a second voltage higher than the first voltage, such that a third voltage output via the output terminal to the light-emitting diode is greater than the first voltage;

a switching element coupled with the light-emitting diode, the microcontroller is coupled with a control terminal of the switching element to control light-emitting state of the light-emitting diode;

wherein the electrical device is one of: a smoke detector, a fire alarm controller, and an intrusion detector.

2. The electrical device of claim 1, wherein the boost circuit further comprises a first diode connected between the first input terminal and the positive electrode of the first capacitor to prevent reverse charging of the battery by the first capacitor.

3. The electrical device of claim 2, wherein the boost circuit further comprises a second diode connected between the positive electrode of the first capacitor and the second capacitor to prevent reverse charging of the first capacitor by the second capacitor.

4. The electrical device of claim 1, wherein the second capacitor is an electrolytic capacitor.

5. The electrical device of claim 1, wherein the microcontroller is configured to cause the first capacitor to charge the second capacitor with the second voltage having twice the amplitude of the first voltage by setting amplitude of the high level of the pulse width modulation signal to the first voltage.

6. The electrical device of claim 1, wherein light-emitting diode is a blue light-emitting diode.

* * * * *